US012615191B1

(12) United States Patent
Mendelson et al.

(10) Patent No.: US 12,615,191 B1
(45) Date of Patent: Apr. 28, 2026

(54) NETWORK COMMUNICATION ROUTING WITH CLUSTERING

(71) Applicant: Intuit Inc., Mountain View, CA (US)

(72) Inventors: Shon Mendelson, Tel Aviv (IL); Natalie Bar Eliyahu, Petah Tikva (IL); Hadassah Gila Dekelboim, Elad (IL); Guy Elad, Petah Tikva (IL); Amnon Mor, Tel Aviv (IL); Shahar Glatman, Haifa (IL)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 19/331,939

(22) Filed: Sep. 17, 2025

(51) Int. Cl.
　　*H04L 41/147* (2022.01)
　　*H04L 45/302* (2022.01)

(52) U.S. Cl.
　　CPC .......... *H04L 41/147* (2013.01); *H04L 45/306* (2013.01)

(58) Field of Classification Search
　　CPC ..... H04L 67/63; H04L 41/5074; H04L 41/16; H04L 41/147; H04L 45/306; G06F 18/23; G06F 18/24; G06F 16/35; G06F 16/355
　　See application file for complete search history.

(56) References Cited

U.S. PATENT DOCUMENTS

| | | | | |
|---|---|---|---|---|
| 10,291,559 | B1 * | 5/2019 | Snider ................... | G06N 20/00 |
| 10,560,579 | B1 * | 2/2020 | Wu ..................... | H04M 3/5233 |
| 11,178,285 | B2 * | 11/2021 | McCord ............. | H04M 3/5183 |
| 11,223,540 | B1 * | 1/2022 | Lilley .................. | H04L 67/306 |
| 11,223,553 | B1 * | 1/2022 | Shcherbakov ........ | H04L 45/124 |
| 11,336,539 | B2 * | 5/2022 | Rath ................... | G06Q 30/016 |
| 11,983,746 | B2 * | 5/2024 | Choudhary ........... | G06F 40/216 |
| 12,211,303 | B2 * | 1/2025 | Makani ................ | G06V 30/418 |
| 12,301,520 | B2 * | 5/2025 | Bradley ................. | G06F 40/30 |
| 2014/0207716 | A1 * | 7/2014 | Hsu ........................ | G06F 16/35 |
| | | | | 706/12 |
| 2019/0004890 | A1 * | 1/2019 | Venkataraman ...... | G06F 11/079 |
| 2023/0367689 | A1 * | 11/2023 | Xu ........................ | G06F 18/285 |
| 2024/0202738 | A1 * | 6/2024 | Barrientos ............. | G06Q 10/10 |
| 2025/0293957 | A1 * | 9/2025 | Vasseur ............... | H04L 41/5074 |

* cited by examiner

*Primary Examiner* — Alex Tran
(74) *Attorney, Agent, or Firm* — Lathrop GPM LLP

(57) ABSTRACT

A clustering model clusters multiple network communications through a clustering model to generate multiple clusters. Multiple judge models classify the network communications to obtain multiple predictions for each network communication of the network communications. Multiple sample network communications in a cluster are selected based on a discrepancy amongst the predictions of each sample network communication in the sample network communications. A lead model evaluates the sample network communications to select a judge model of the judge models for the cluster. The selected judge model is assigned to the cluster.

20 Claims, 6 Drawing Sheets

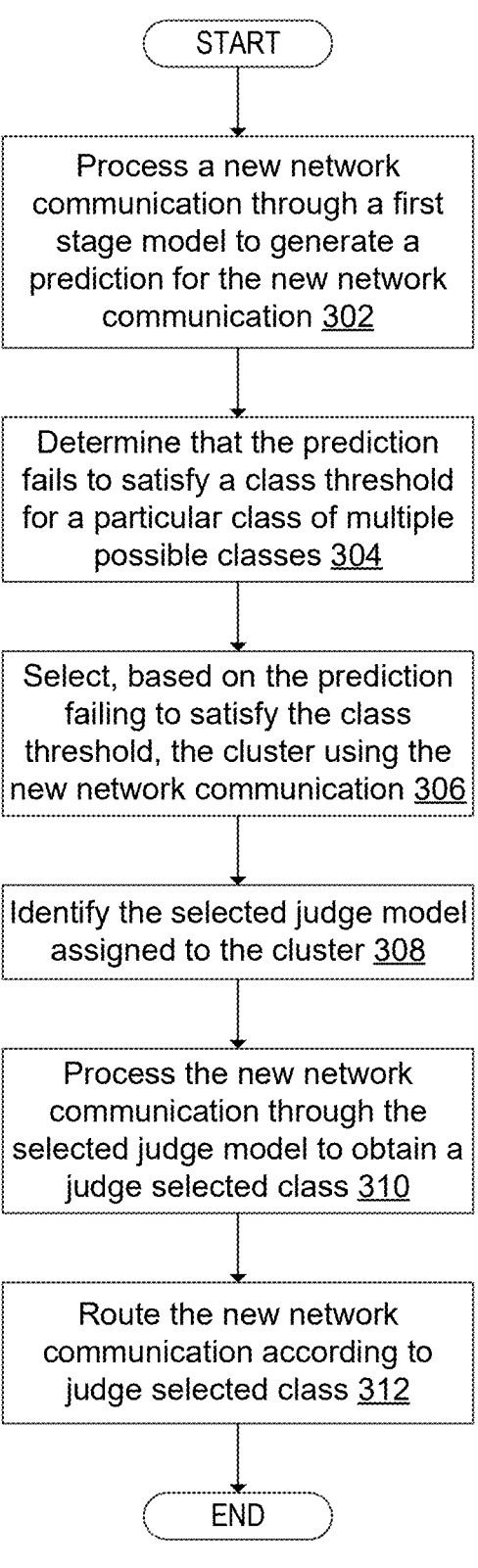

START

Process a new network communication through a first stage model to generate a prediction for the new network communication 302

Determine that the prediction fails to satisfy a class threshold for a particular class of multiple possible classes 304

Select, based on the prediction failing to satisfy the class threshold, the cluster using the new network communication 306

Identify the selected judge model assigned to the cluster 308

Process the new network communication through the selected judge model to obtain a judge selected class 310

Route the new network communication according to judge selected class 312

END

*FIG. 3*

500
Computing
System

NETWORK COMMUNICATION ROUTING WITH CLUSTERING

BACKGROUND

Server systems are configured to receive and process network communications. Part of processing network communications is routing the network communication from the ingress to the server system to an endpoint that processes the network communication. The endpoint may be in a collection of multiple possible endpoints. The routing determines which endpoint of the multiple possible endpoints should process the network communication.

In certain cases, the actual endpoint is not explicitly defined in the network communication. For example, the actual endpoint may be defined by processing the content of the network communication. In such a scenario, routing involves processing the content to determine the appropriate endpoint from the multiple possible endpoints. However, a challenge exists in accurately interpreting the content and selecting the endpoint.

SUMMARY

In general, in one aspect, one or more embodiments relate to a method that includes clustering, by a clustering model, multiple network communications through a clustering model to generate multiple clusters, classifying, by multiple judge models, the network communications to obtain multiple predictions for each network communication of the network communications, and selecting multiple sample network communications in a cluster of the clusters based on a discrepancy amongst the predictions of each sample network communication in the sample network communications. The method further includes a lead model evaluating the sample network communications to select a judge model of the judge models for the cluster and assigning the selected judge model to the cluster.

In general, in one aspect, one or more embodiments relate to a system including a computer processor. The system also includes a clustering model executing on the computer processor for causing the computer system to cluster multiple network communications through a clustering model to generate multiple clusters. The system also includes multiple judge models executing on the at least one computer processor for causing the computer system to classify the network communications to obtain multiple predictions for each network communication of the network communications. The system also includes a discrepancy detector executing on the computer processor and configured to select multiple sample network communications in a cluster of the clusters based on a discrepancy amongst the predictions of each sample network communication in the sample network communications. The system also includes a lead model executing on the computer processor and configured to evaluate the sample network communications to select a judge model of the judge models for the cluster. The system also includes a training program executing on the at least one computer processor configured to assign the selected judge model to the cluster.

In general, in one aspect, one or more embodiments relate to a method that includes selecting the cluster of a plurality of clusters using a new network communication. The clusters are determined by a clustering model. The method further includes identifying a selected judge model assigned by a lead model to the cluster, processing the new network communication through the selected judge model to obtain a judge selected class of the plurality of classes, and routing the new network communication according to a judge selected class.

Other aspects of one or more embodiments will be apparent from the following description and the appended claims.

BRIEF DESCRIPTION OF DRAWINGS

FIG. 3 shows a flowchart for the inference phase in accordance with one or more embodiments.

Like elements in the various figures are denoted by like reference numerals for consistency.

DETAILED DESCRIPTION

Figure 1A:
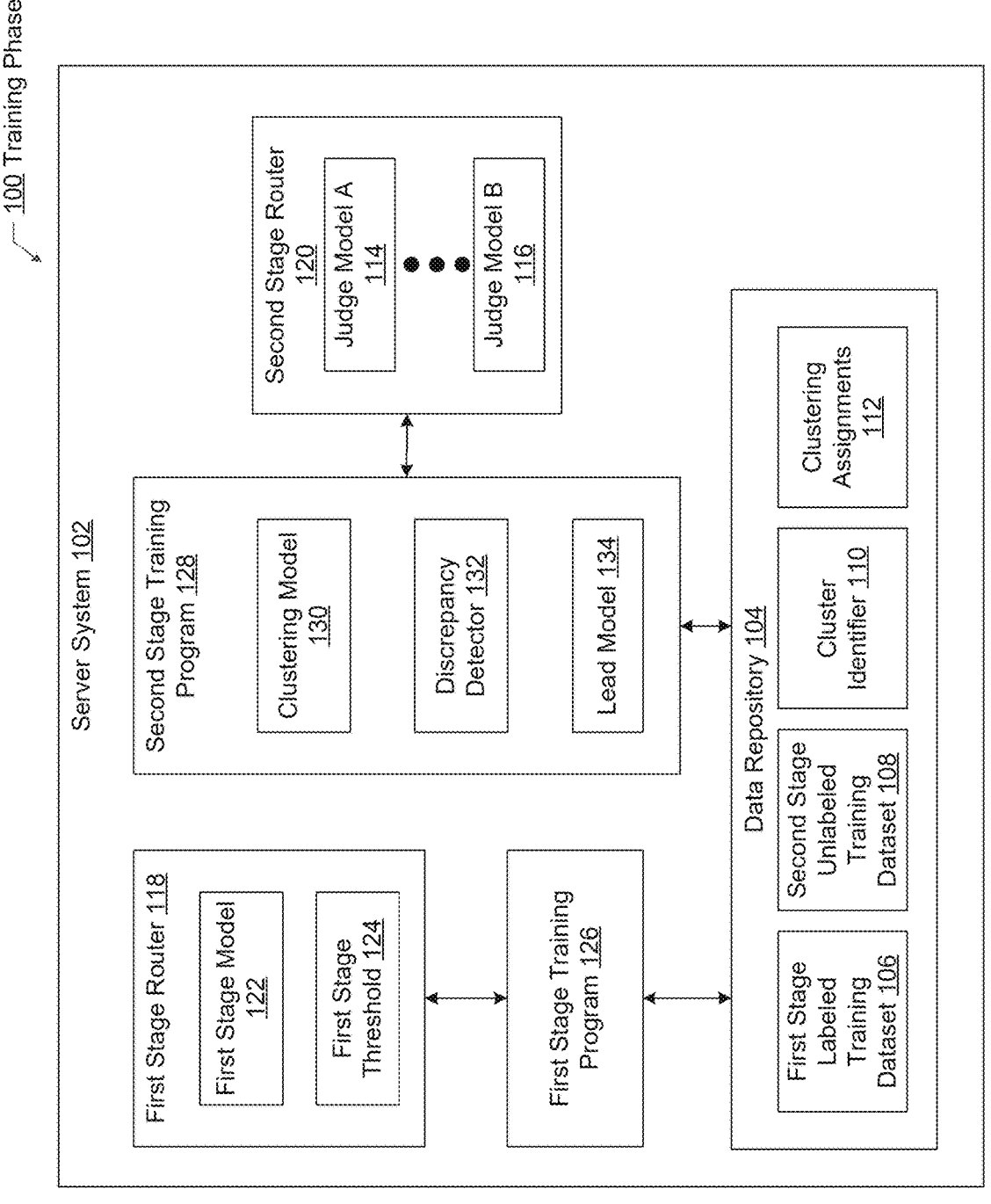
FIG. 1A shows a diagram of a server system at a training phase in accordance with one or more embodiments.

One or more embodiments are directed to selecting an endpoint from multiple possible endpoints for routing network communications. A network communication is a communication that is transmitted via the network. The endpoint may be in the server system or separate from the server system. In order to route the network communication, the network communication is routed through a judge machine learning model (i.e., judge model). The judge model is configured to process the content of the network communication to classify the network communication into one of multiple classes. Each class corresponds to a routing endpoint. Thus, the selection of the class by the particular judge model causes the routing to a particular endpoint.

For accuracy of the server system, the server system includes multiple judge models. Each judge model uses computing resources and has varying degrees of accuracy for different types of content. Because of the computing resource usage and the large volume of network communications processed by the endpoint, having each judge model process each network communication is infeasible. To address this challenge, one or more embodiments train a machine learning system to select the appropriate judge model for a particular network communication. The trained machine learning system then processes the new network communication to determine the endpoint of the network communication and routes the network communication to the endpoint.

Because of the number of communications and the variability in communications, the training is performed using unlabeled training data. To perform the training, a training dataset is obtained of a variety of network communications. The training dataset is clustered into multiple clusters based on the content of the network communications. Each cluster is processed by each of the judge models to generate predictions for each network communication in the cluster. The prediction is of which class should be assigned to a particular network communication. Each cluster may have a consensus rate specifying the degree to which the judge models come to a consensus for each of the network communications in the cluster. Clusters in which the consensus rate satisfy a threshold are assigned to a corresponding judge model based on resource usage. Clusters that do not satisfy a consensus rate are further processed to select a judge model for the cluster.

The further processing includes determining the network communications in the cluster for which a discrepancy exists in the predictions. A sample set of such network communications are selected and processed by a lead model to select a judge model for the cluster. The lead model is a resource usage intensive large model that is trained to generate accurate predictions at the cost of a large amount of resource usage. For example, the lead model may be a large language model while the judge models may be a multilayer perceptron model. Once the judge model is selected using the output of the lead model, the judge model is assigned to a cluster. Then, for a cluster, future network predictions are passed to that particular judge model.

Attention is now turned to the figures. FIG. 1A shows a diagram of a server system (102) at a training phase (100) in accordance with one or more embodiments. The server system (102) may be the same as the computing system described in FIG. 5A and FIG. 5B. The server system (102) includes a data repository (104). The data repository (104) is a type of storage unit or device (e.g., a file system, database, data structure, or any other storage mechanism) for storing data. The data repository (104) may include multiple different, potentially heterogeneous, storage units and/or devices. The data repository (104) includes the functionality to store a first stage labeled training dataset (106), a second stage unlabeled training dataset (108), cluster identifiers (110), and clustering assignments (112).

The first stage labeled training dataset (106) is a set of training data that is labeled. The training data includes a set of network communications. A network communication is a communication from the network, such as the Internet or an intranet. The network communication is received via a hardware and software network interface to the server system (102). For example, the network communication may be received from a user device. Network communications are routed to one or more endpoints. Each endpoint is a point of processing the network communications. For network communications that are malicious, the endpoint may be a process that optionally logs the network communication and drops the network communication without exposing the server system to the malicious communication or without exposing sensitive information outside of the server system. The first stage labeled training dataset (106) is labeled so that each network communication has a corresponding label. The label is a classification of the network communication. For example, the label may be defined by another machine learning model, using the feedback of a user, or based on another labeling system.

The second stage unlabeled training dataset (108) is a set of training data that does not have labels. The second stage unlabeled training data includes network communications without labels. For example, the second stage unlabeled training dataset (108) may be real world network communications that are gathered by the server system for which the label is unknown. The second stage unlabeled training dataset (108) may be a much larger training dataset and have more variability than the first stage labeled training dataset.

The cluster identifiers (110) are identifiers of clusters. A cluster is a grouping of network communications. Clusters are non-overlapping. Thus, network communications in one cluster are not in other clusters. Each cluster identifier may uniquely identify a cluster and include a description of the cluster. For example, the unique identifier may be an alphanumeric identifier. The description of the cluster is used to select the cluster amongst the other clusters. The description of the cluster may be a vector description of the cluster, such as a description of the boundaries of the cluster, a description of the centroid of the cluster, or other description.

Clustering assignments (112) are assignments of clusters to judge models (e.g., judge model A (114), judge model B (116)). The clustering assignments (112) may store a unique identifier of a cluster model related or otherwise linked to the unique identifier of the judge model assigned to the cluster. For example, the clustering assignments (112) may be stored in a table.

Continuing with FIG. 1A, the server system (102) also includes a first stage router (118) and a second stage router (120). The first stage router (118) is configured to perform an initial selection of an endpoint for a network communication. The first stage router (118) is a lower resource intensive router that is configured to classify the network communication and select an endpoint. The first stage router (118) may have less resource usage and lower accuracy than the second stage router (120). As such, the first stage router (118) is configured to perform an initial selection. The first stage router (118) may be implemented with a first stage model (122) and a first stage threshold (124). For example, the first stage router (118) may include a first stage model (122) and a first stage threshold (124). The first stage model (122) is a machine learning model or a regular expression model that is configured to perform classification. By way of an example, the first stage model (122) may be an isolation forest model. The first stage threshold (124) is a threshold on the confidence output by the first stage model. Specifically, the output of the first stage model (122) is a prediction as to the class for the endpoint and a confidence value in the prediction. The confidence value is the probability that the prediction is accurate. The first stage threshold is a threshold on the confidence value that dictates whether the network communication is processed by the second stage model.

The first stage router (118) is trained by a first stage training program (126). The first stage training program (126) may be a regular expression generator, a machine learning model training process having a loss function and a backpropagation process or another training program.

The second stage router (120) is configured to route network communications for which the first stage router (118) fails to route based on the confidence. The second stage router (120) includes judge models (e.g., judge model A (114), judge model B (116)). Each judge model is a machine learning model that is configured to individually process the network communication and select an endpoint for the network communication. The judge models are heterogeneous. For example, judge models may be of different types or have different weights than other judge models. One or more of the judge models may be lightweight models.

The second stage router (120) is connected to a second stage training program (128). The second stage training program (128) is configured to train the second stage router (120). The second stage training program (128) includes a clustering model (130), a discrepancy detector (132), and a lead model (134).

The clustering model (130) is a model that is configured to cluster the network communications. For example, the clustering model (130) may be a K-means clustering model, a density-based spatial clustering of applications with noise (DBSCAN) model, a Gaussian mixture model, and others. The clustering model (130) is configured to individually transform each network communication into a vector representation of the content of the network communication and features about the network communication. The clustering model (130) is then configured to group the vector representations into clusters based on vector distances between the vector representations.

The discrepancy detector (132) is configured to determine a discrepancy between the predictions for a particular network communication. For example, the discrepancy detector may detect the degree to which the various judge models agree or disagree on the class assignment for the particular network communication. The discrepancy level is the degree to which the various judge models disagree. Thus, for example if two judge models have the same prediction and the third judge model has a different prediction, the discrepancy level may be 33%. Different measurements may be used to determine the discrepancy level. Further, although a lower value may be indicative of less discrepancy in the example, a higher value may be indicative of less discrepancy in other embodiments.

The lead model (134) is a machine learning model configured to accurately select a class for network communications. For example, the lead model (134) may be a significantly larger model than the judge model. As such, the computing resources used by the lead model may be significant in order to process a network communication. Because of the increased computing resource usage, using the lead model (134) on each network communication is cost prohibitive. However, the lead model (134) is configured to resolve discrepancies. For example, the output of the lead model is used to select a particular judge model for a particular cluster.

The machine learning models, such as the judge models and the lead model, in the server system (102) may include neural networks and may operate using one or more layers of weights that may be sequentially applied to sets of input data, which may be referred to as input vectors. For each layer of a machine learning model, the weights of the layer may be multiplied by the input vector to generate a collection of products, which may then be summed to generate an output for the layer that may be fed, as input data, to a next layer within the machine learning model. The output of the machine learning model may be the output generated from the last layer within the machine learning model. Multiple machine learning models may operate sequentially or in parallel. The output may be a vector or scalar value. The layers within the machine learning model may be different and correspond to different types of models. As an example, the layers may include layers for recurrent neural networks, convolutional neural networks, transformer models, attention layers, perceptron models, etc. Perceptron models may include one or more fully connected (also referred to as linear) layers that may convert between the different dimensions used by the inputs and the outputs of a model.

The number of layers, the number of nodes in the layers, and the types of layers may dictate the size of the corresponding model. Thus, the lead model, which is the most complex model in the server system, may have more layers and more nodes than the judge models. Thus, executing the lead model may involve performing more calculations than the other models.

The machine learning models may be trained by inputting training data to a machine learning model to generate training outputs that are compared to expected outputs. For supervised training, the expected outputs may be labels associated with a given input. For unsupervised learning, the expected outputs may be previous outputs from the machine learning model. The difference between the training output and the expected output may be processed with a loss function to identify updates to the weights of the layers of the model. After training on a batch of inputs, the updates identified by the loss function may be applied to the machine learning model to generate a trained machine learning model. Different algorithms may be used to calculate and apply the updates to the machine learning model, including back propagation, gradient descent, etc.

Figure 1B:
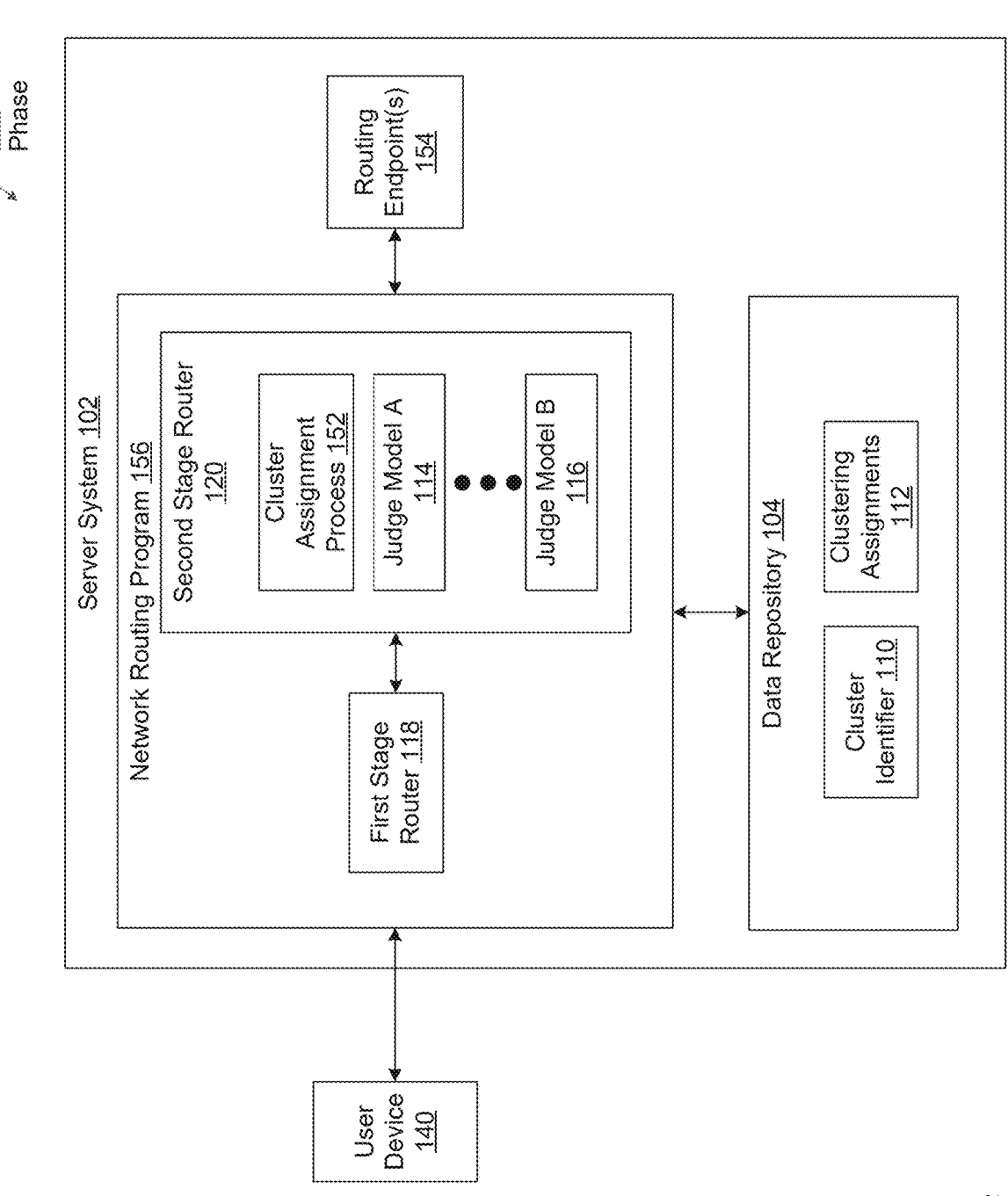
FIG. 1B shows a diagram of a server system at inference phase in accordance with one or more embodiments.

The system of FIG. 1A is configured to address a problem of training a server system as a whole to route network communications. FIG. 1B shows a diagram of a server system (102) at inference phase (150) in accordance with one or more embodiments. The components of FIG. 1B that have the same name and reference number are the same as shown in FIG. 1A, after training. For example, the data repository (104), cluster identifier (110), clustering assignments (112), judge models (e.g., judge model A (114), judge model B (116)), first stage router (118) and second stage router (120) are the same as discussed above.

The server system (102) is connected to a user device (140). The user device (140) corresponds to a computing system that is configured to transmit network communications. The user device (140) is any device from which network communications via a network are received. Multiple user devices may exist that may transmit multiple network communications.

The server system (102) at inference phase (150) is connected or includes one or more routing endpoints (154). A routing endpoint (154) is an endpoint configured to process a network communication. For example, a routing endpoint may be a large language model that is configured to respond to the content of the network communication. As another example, the routing endpoint may be a software application. As another example, the routing endpoint may be a data store or log file. Other routing endpoints may exist. Each routing endpoint corresponds to a class in which the judge model performs a classification. Namely, the class uniquely identifies the routing endpoint.

The server system (102) includes a network routing program (156) connected to a data repository (104). The network routing program (156) is software or firmware that is configured to route network communications to a corresponding routing endpoint. The network routing program (156) includes the first stage router (118) (described above) and the second stage router (120) (described above). As shown in FIG. 1B, the second stage router (120) further includes a cluster assignment process (152) at inference stage. The cluster assignment process (152) is configured to assign a new network communication to a cluster. For example, the cluster assignment process (152) is configured to transform a network communication to a vector embedding and identify a cluster having a closest matching vector embedding. The cluster assignment process (152) may be configured to implement cosine distance or another distance function to perform the assignment.

While FIG. 1 shows a configuration of components, other configurations may be used without departing from the scope of one or more embodiments. For example, various components may be combined to create a single component. As another example, the functionality performed by a single component may be performed by two or more components.

Figure 2:
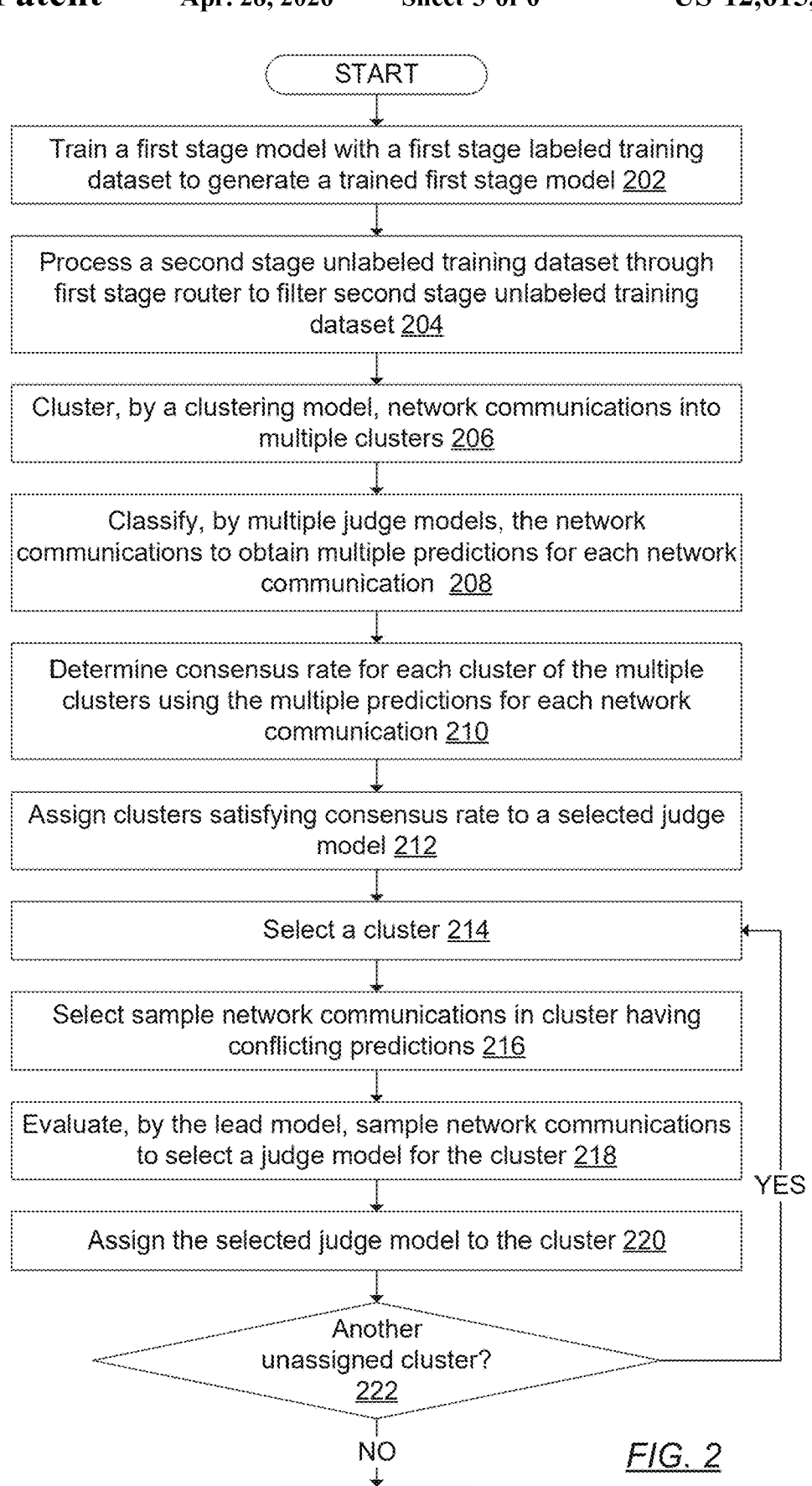
FIG. 2 shows a flowchart for the training phase in accordance with one or more embodiments.

FIG. 2 and FIG. 3 shows flowcharts of methods in accordance with one or more embodiments. The methods of FIG. 2 and FIG. 3 may be implemented using the system of FIG. 1A and FIG. 1B and one or more of the steps may be performed on or received at one or more computer processors. While the various steps in these flowcharts are presented and described sequentially, at least some of the steps may be executed in different orders, may be combined or omitted, and at least some of the steps may be executed in parallel. Furthermore, the steps may be performed actively or passively.

FIG. 2 shows a flowchart for the training phase in accordance with one or more embodiments. Block 202 includes training a first stage model with a first stage labeled training dataset to generate a trained first stage model. The first stage model is trained with a labeled training dataset by executing the first stage model on the input network communications in the labeled training dataset to generate a set of output predictions. The output predictions are individually compared against the corresponding label in the labeled training dataset to generate a loss. The loss accounts for the percentage of output predictions that are correct (i.e., match the corresponding label) and the percentage of predictions that are incorrect (i.e., do not match the corresponding label). The loss is backpropagated through the first stage model to update the first stage model. If the first stage model is a random forest model, the loss may be used to add trees to the random forest model. After performing Block 202, a trained first stage model exists. At any time, further training may be performed with feedback from processing new network communications at the inference stage.

When the full or initial training of the first stage model is performed, the machine learning system of the second stage router may be trained. The machine learning system of the second stage router is a more robust set of machine learning models than the first stage router and is designed to handle network communications that may not be as clear. Training the second stage router may be performed as follows.

Block 204 includes processing a second stage unlabeled training dataset through the first stage router to filter second stage unlabeled training dataset. The second stage unlabeled training dataset may be real world data that does not have label. The first stage router processes the second stage unlabeled training dataset to individually classify each network communication in the second stage unlabeled training dataset. The second stage unlabeled training dataset is then filtered based on the classification. Different types of filtering may be performed.

In a first type of filtering, any network communication that is assigned one or more predefined classes of all possible classes are removed from the second stage unlabeled training dataset. For example, consider the example scenario in which the class is a first class and a second class. In the example scenario, the network communications classified to the first class may be removed from the second stage unlabeled training dataset while the network communications classified in the second class by the first stage router may remain.

In a second type of filtering, the filtering is performed by a confidence value. Specifically, with each classification by the first stage router, the first stage router may output a confidence value associated with the classification. Network communications having greater than a threshold confidence value may be removed from the second stage unlabeled training dataset while network communications not satisfying the confidence threshold may remain. The result is a set of unlabeled training data having low confidence of correct classification by the first lightweight router.

The different types of filtering may be combined. For example, high confidence and being in a particular set of classes may cause a network communication in the unlabeled training dataset to be filtered out. As another example, high confidence or a particular set of classes may cause the network communication to be filtered out.

Block 206 includes clustering, by a clustering model, network communications into multiple clusters. In one or more embodiments, the network communications in the second stage unlabeled training dataset are clustered into multiple clusters. To perform the clustering, attributes (e.g., session, user identifier, and other metadata) and content within the network communication (e.g., the body of the network communication) is transformed into a feature vector. The feature vector is a vector representation of the corresponding network communication. The feature vectors of the network communications are processed by the clustering model. The clustering model algorithmically groups vectors that are closer to each other in vector space with each other. Thus, network communications that have vector representations closer to each other in vector space are in the same cluster, whereas network communications that are farther from each other are in different clusters.

Block 208 includes classifying, by multiple judge models, the network communications to obtain multiple predictions for each network communication. Each network communication is processed by each of the judge models in one or more embodiments. The result of Block 208 is a set of predictions for each network communication, whereby the set of predictions has a prediction for each judge model. Block 208 may be performed concurrently with Block 206.

Block 210 includes determining a consensus rate for each cluster of the multiple clusters using the multiple predictions for each network communication. For each network communication, the discrepancy is determined based on the set of predictions for the particular network communication. Network communications having a discrepancy satisfying a discrepancy threshold are identified and labeled as such. The discrepancy satisfies the discrepancy threshold when a greater than a threshold percentage or number of judge models disagree on the class. After determining the discrepancy threshold for each network communication in the cluster, the consensus rate for the cluster is determined. The consensus rate is the number or percentage of network communications that are not labeled as satisfying the discrepancy threshold. Namely, the consensus rate indicates the amount of agreement of the judge models for the cluster as a whole. The consensus rate may be assigned to the cluster as a whole.

Block 212 includes assigning clusters satisfying the consensus rate to a selected judge model. If the consensus rate of the cluster satisfies the consensus threshold indicating that most judge models agree on the classifications in the cluster, then a judge model is selected for the cluster based on other attributes. The judge model may be selected based on percentage in agreement with the remaining judge models. The judge model may also be selected based on the size of the judge model (e.g., lower resource usage) and the number of clusters already assigned to the judge model. Other reasons for selecting a particular judge model may be used.

Block 214 includes selecting a cluster. For the remaining clusters that do not satisfy the consensus rate, further processing is performed. The further processing is performed for each cluster individually to assign the cluster to a judge model.

Block 216 includes selecting sample network communications in a cluster having conflicting predictions. In one or more embodiments, the sample set is a smaller set of network communications than the network communications that are in the cluster. Further, the sample set may be all, or a subset, of the network communications labeled with the discrepancy label indicating discrepancy amongst the judge models.

Block 218 includes evaluating, by the lead model, sample network communications to select a judge model for the cluster. The sample set is transmitted to the lead model as part of a prompt to the lead model. The lead model is requested to evaluate the sample set to determine the class for each network communication. The output of the lead model may be a selection of a class for each network communication in the sample set. The judge model that has a greater percentage of matches with the lead model may be selected as the judge model for the cluster. If multiple judge models have equal matches, other characteristics, such as resource usage may be used. In another example, the output of the lead model may be the selection of the judge model. For example, the lead model may be prompted with the sample set and the sets of predictions for each network communication in the sample set. The lead model may be requested to identify a judge model that provides the most accurate predictions. The result of Block 218 is the selection of a judge model for the cluster.

Block 220 includes assigning the selected judge model to the cluster. An identifier of the judge model is stored with an identifier of the cluster in the clustering assignment structure of the data repository.

Block 222 includes determining whether another unassigned cluster exists. If another cluster exists, then the flow returns to Block 214. The processing of the clusters may be performed concurrently with each other to concurrently assign judge models to clusters. Once the assignment is complete, the flow may proceed to inferring new network communications in FIG. 3.

FIG. 3 shows a flowchart for generating a new network communication in accordance with one or more embodiments. Block 302 includes processing a new network communication through a first stage model to generate a prediction for the new network communication. The new network communication is a network communication received in real time from a user device via the network interface. The new network communication is routed to the first stage router. The first stage router generates a prediction of a class and a confidence of the prediction for the new network communication.

Block 304 includes determining that the prediction fails to satisfy a class threshold for a particular class of multiple possible classes. For example, the class threshold may be a threshold on the confidence value that is determined for a particular class to which the prediction applies. Each class may have a corresponding class threshold for predictions. If the prediction satisfies the confidence threshold, then the processing stops, and the first stage router routes the network communication to the endpoint matching the class. If the prediction fails to satisfy the class threshold, the flow proceeds to the second stage router.

Block 306 includes selecting, based on the prediction failing to satisfy the class threshold, the cluster using the new network communication. The cluster assignment process transforms the new network communication to a vector representation and determines the vector distance to each cluster from the vector representation. The cluster having the closest vector distance is selected for the new network communication.

Block 308 includes identifying the selected judge model assigned to the cluster. The cluster selected for the new network communication is identified in the clustering assignment storage to determine the judge model from Block 220 that is assigned to the cluster. Thus, the result of Block 308 and Block 308 is the identification of which cluster most closely matches the new network communication, and correspondingly, which judge model is assigned to the most closely matching cluster.

Block 310 includes processing the new network communication through the selected judge model to obtain a judge selected class. The new network communication is processed by the judge model and the output of the judge model is the class that the judge model determines. The class is assigned to the new network communication.

Block 312 includes routing the new network communication according to the judge selected class. The new network communication is then transmitted to the endpoint matching the judge selected class.

Figure 4:
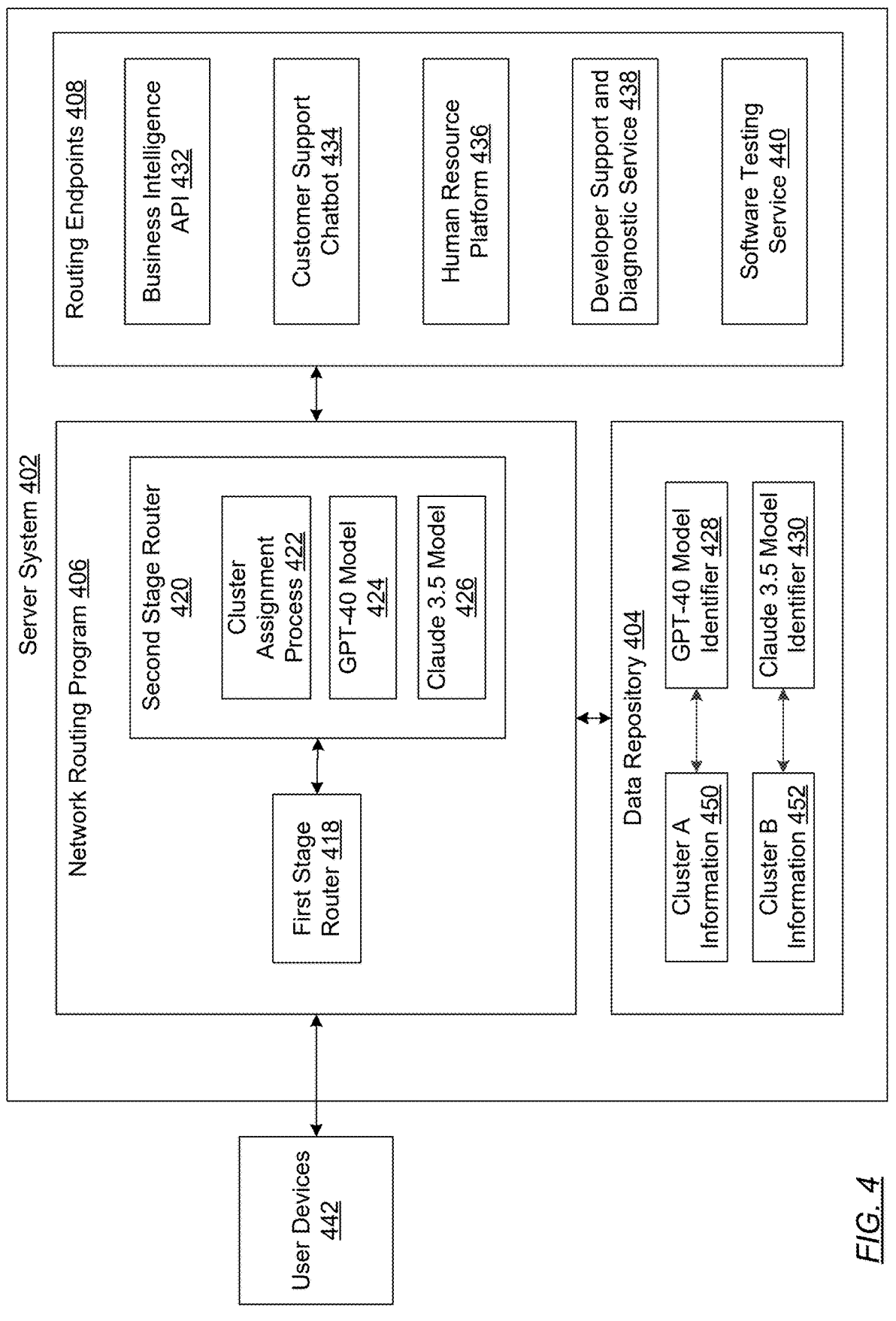
FIG. 4 shows an example in accordance with one or more embodiments.

FIG. 4 shows an example of the flow for a server system to route communications to various endpoints. This server system (402) includes a network routing program (406) that is configured to efficiently routing prompts from user devices (442) of various teams across the organization to the correct internal service or application. The server system (400) includes multiple routing endpoints (408). For example, the routing endpoints (408) may include a business intelligence application programming interface (API) (432), a customer support chatbot (434), a human resource platform (436), a developer support and diagnostic service (438), and a software testing service (440).

During the training phase, two clusters are identified based on an existing set of prompts. For cluster A, denoted by cluster A information (450), has prompts for general business queries. The characteristics or attributes of the prompts that indicate the separate clustering include natural language, often from non-technical teams like sales or marketing, and relate to standard business operations. For cluster B, denoted by cluster B information (452), has prompts for technical and code based queries. The characteristics or attributes of the prompts that indicate the separate clustering include being typically from engineering teams, contain code snippets, error logs, or highly technical jargon. During the training phase, cluster A is assigned to the GPT-4o Model (424) and Cluster B is assigned to the Claude 3.5 model (426).

The GPT-4o model (424) is the correct model because the GPT-4o model is a powerful generalist model, excellent at understanding natural language business queries. The GPT-4o model is a best fit here because the task requires strong language comprehension rather than specialized technical knowledge. Conversely, the Claude 3.5 model (426) is a model that has superior code analysis capabilities. Claude 3.5 model (426) operates better here because it can accurately parse the code and traceback to classify the intent as a highly technical issue, a task where a generalist model might misinterpret the context or fail to grasp the query's true nature. However, the training program does not need to directly determine the attributes of the respective models. Rather, the training program determines the assignments based on accuracy and clustering.

The assignments are stored in the data repository (404) whereby cluster A information (450) is related to the GPT-4o model identifier (428) and cluster B information (452) is related to the Claude 3.5 Model identifier (430).

During inference stage, two communications are received in the example. In a first communication, a prompt from a sales manager is the following: {"user_query": "Generate a summary of last quarter's lead conversion rates for the EMEA region."}. The first stage router (418) fails to route the query. The second stage router (420) then processes the query. The cluster assignment process (422) determines that the cluster is cluster A, based on the information in the cluster, which is assigned to the GPT-4o model (424). The GPT-4o model (424) processes the query to determine that the query should be routed to the system routes this to the "Business Intelligence API" (432).

In a second communication, a prompt from a developer is the following: {"user_query": "My Python script for the data pipeline is failing with a serialization error. Here's the traceback: [ . . . ]. Can you identify the likely cause?"}. The first stage router (418) fails to route the query. The second stage router (420) then processes the query. The cluster assignment process (422) determines that the cluster is cluster A, based on the information in the cluster, which is assigned to the Claude 3.5 model (426). The Claude 3.5 model (426) processes the query to determine that the query should be routed to the system routes this to the "Developer Support & Diagnostics Service" (438).

As shown, using the clustering and the judge model process, the system is able to identify the optimal judge model to process the query while not using the lead judge model. The judge model can then accurately determine the endpoint to process the query.

One or more embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure.

Figure 5A:
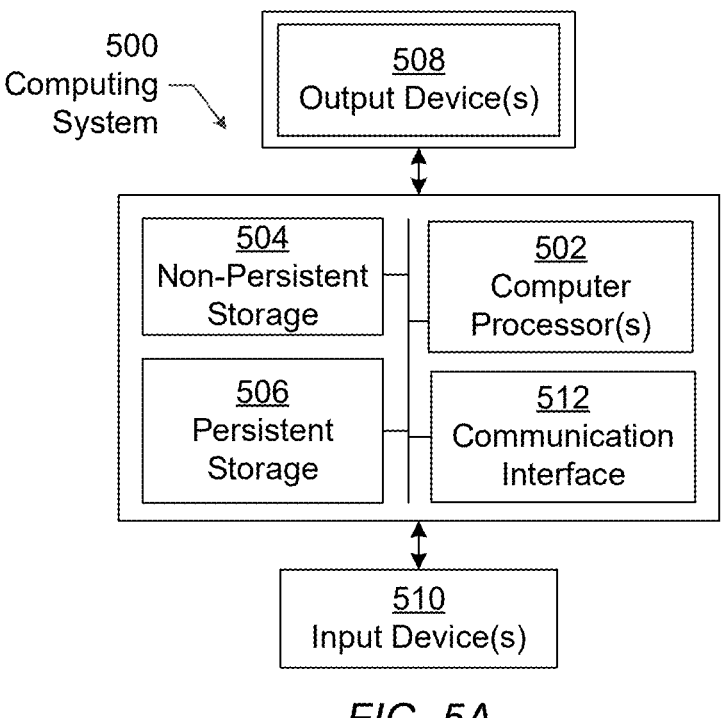
FIG. 5A and FIG. 5B shows a computing system in accordance with one or more embodiments.

For example, as shown in FIG. 5A, the computing system (500) may include one or more computer processor(s) (502), non-persistent storage device(s) (504), persistent storage device(s) (506), a communication interface (508) (e.g., Bluetooth interface, infrared interface, network interface, optical interface, etc.), and numerous other elements and functionalities that implement the features and elements of the disclosure. The computer processor(s) (502) may be an integrated circuit for processing instructions. The computer processor(s) (502) may be one or more cores, or micro-cores, of a processor. The computer processor(s) (502) includes one or more processors. The computer processor(s) (502) may include a central processing unit (CPU), a graphics processing unit (GPU), a tensor processing unit (TPU), combinations thereof, etc.

The input device(s) (510) may include a touchscreen, keyboard, mouse, microphone, touchpad, electronic pen, or any other type of input device. The input device(s) (510) may receive inputs from a user that are responsive to data and messages presented by the output device(s) (512). The inputs may include text input, audio input, video input, etc., which may be processed and transmitted by the computing system (500) in accordance with one or more embodiments. The communication interface (508) may include an integrated circuit for connecting the computing system (500) to a network (not shown) (e.g., a local area network (LAN), a wide area network (WAN) such as the Internet, mobile network, or any other type of network) or to another device, such as another computing device, and combinations thereof.

Further, the output device(s) (512) may include a display device, a printer, external storage, or any other output device. One or more of the output device(s) (512) may be the same or different from the input device(s) (510). The input device(s) (510) and output device(s) (512) may be locally or remotely connected to the computer processor(s) (502). Many different types of computing systems exist, and the aforementioned input device(s) (510) and output device(s) (512) may take other forms. The output device(s) (512) may display data and messages that are transmitted and received by the computing system (500). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a solid state drive (SSD), compact disk (CD), digital video disk (DVD), storage device, a diskette, a tape, flash memory, physical memory, or any other computer readable storage medium. Specifically, the software instructions may correspond to computer readable program code that, when executed by the computer processor(s) (502), is configured to perform one or more embodiments, which may include transmitting, receiving, presenting, and displaying data and messages described in the other figures of the disclosure.

Figure 5B:
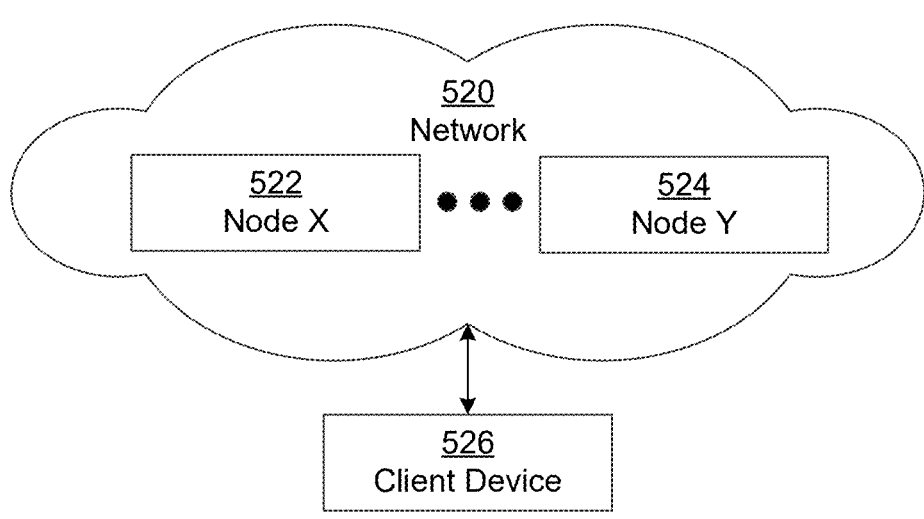

The computing system (500) in FIG. 5A may be connected to, or be a part of, a network. For example, as shown in FIG. 5B, the network (520) may include multiple nodes (e.g., node X (522) and node Y (524), as well as extant intervening nodes between node X (522) and node Y (524)). Each node may correspond to a computing system, such as the computing system shown in FIG. 5A, or a group of nodes combined may correspond to the computing system shown in FIG. 5A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (500) may be located at a remote location and connected to the other elements over a network.

The nodes (e.g., node X (522) and node Y (524)) in the network (520) may be configured to provide services for a client device (526). The services may include receiving requests and transmitting responses to the client device (526). For example, the nodes may be part of a cloud computing system. The client device (526) may be a computing system, such as the computing system shown in FIG. 5A. Further, the client device (526) may include or perform all or a portion of one or more embodiments.

The computing system of FIG. 5A may include functionality to present data (including raw data, processed data, and combinations thereof) such as results of comparisons and other processing. For example, presenting data may be accomplished through various presenting methods. Specifically, data may be presented by being displayed in a user interface, transmitted to a different computing system, and stored. The user interface may include a graphical user interface (GUI) that displays information on a display device. The GUI may include various GUI widgets that organize what data is shown, as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be a temporary, permanent, or a semi-permanent communication channel between two entities.

The various descriptions of the figures may be combined and may include, or be included within, the features described in the other figures of the application. The various elements, systems, components, and steps shown in the figures may be omitted, repeated, combined, or altered as shown in the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before," "after," "single," and other such terminology. Rather, ordinal numbers distinguish between the elements. By way of an example, a first element is distinct from a second element, and the first element may encompass more than one element and succeed (or precede) the second element in an ordering of elements.

Further, unless expressly stated otherwise, the conjunction "or" is an inclusive "or" and, as such, automatically includes the conjunction "and," unless expressly stated otherwise. Further, items joined by the conjunction "or" may include any combination of the items with any number of each item, unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method comprising:

clustering, by a clustering model, a plurality of network communications through the clustering model to generate a plurality of clusters, each cluster comprising a subset of the plurality of network communications;

classifying, by a plurality of judge models, the plurality of network communications to obtain a plurality of predictions for each network communication of the plurality of network communications, wherein the plurality of judge models are separate from the clustering model, and wherein the plurality of predictions are separate from the clustering of the plurality of network communications;

detecting, within a cluster of the plurality of clusters, a discrepancy among a subset of the plurality of predictions for the subset of the plurality of network communications;

selecting a plurality of sample network communications in the cluster of the plurality of clusters based on the discrepancy;

evaluating, by a lead model, the plurality of sample network communications to select a judge model of the plurality of judge models for the cluster; and assigning the selected judge model to the cluster, wherein the selected judge model performs a prediction for new network communications assigned to the cluster, and wherein the selected judge model causes a routing of the new network communications by the prediction.

2. The method of claim 1, further comprising:

selecting, by applying cluster assignment process to a new network communication, the cluster of the plurality of clusters for the new network communication, wherein the cluster assignment process is separate from the plurality of judge models;

identifying, responsive to selecting the cluster, the selected judge model assigned to the cluster;

processing the new network communication through the selected judge model to obtain a judge selected class of a plurality of classes; and routing the new network communication from the cluster according to the judge selected class.

3. The method of claim 2, further comprising:

processing the new network communication through a first stage model to generate a prediction for the new network communication; and determining that the prediction fails to satisfy a class threshold for a particular class of the plurality of classes, wherein selecting the cluster of the plurality of clusters for the new network communication is responsive to the prediction failing to satisfy the class threshold.

4. The method of claim 2, wherein selecting the cluster comprises:

extracting a plurality of features of the new network communication; and selecting the cluster according to the plurality of features.

5. The method of claim 1, further comprising:

training a first stage model with a first stage labeled training dataset to generate a trained first stage model; and processing, by the trained first stage model, a second stage unlabeled training dataset to filter the second stage unlabeled training dataset, wherein the second stage unlabeled training dataset comprises the plurality of network communications after filtering.

6. The method of claim 1, wherein the plurality of sample network communications is a predefined portion of the plurality of predictions in the cluster having the discrepancy satisfying a discrepancy threshold.

7. The method of claim 1, further comprising:

determining a consensus rate for each cluster of the plurality of clusters using the plurality of predictions for each network communication; and assigning a plurality of clusters satisfying consensus rate to at least one judge model based on resource usage of the at least one judge model.

8. A system comprising:

at least one computer processor;

a clustering model executing on the at least one computer processor for causing a computer system to:

cluster a plurality of network communications through the clustering model to generate a plurality of clusters, each cluster comprising a subset of the plurality of network communications;

a plurality of judge models executing on the at least one computer processor for causing the computer system to:

classify the plurality of network communications to obtain a plurality of predictions for each network communication of the plurality of network communications, wherein the plurality of judge models are separate from the clustering model, and wherein the plurality of predictions are separate from the clustering of the plurality of network communications;

a discrepancy detector executing on the at least one computer processor and configured to:

detect, within a cluster of the plurality of clusters, a discrepancy among a subset of the plurality of predictions for the subset of the plurality of network communications, and select a plurality of sample network communications in the cluster of the plurality of clusters based on the discrepancy;

a lead model executing on the at least one computer processor and configured to:

evaluate the plurality of sample network communications to select a judge model of the plurality of judge models for the cluster; and a training program executing on the at least one computer processor configured to assign the selected judge model to the cluster, wherein the selected judge model performs a prediction for new network communications assigned to the cluster, and wherein the selected judge model causes a routing of the new network communications by the prediction.

9. The system of claim 8, further comprising:

a cluster assignment process executing on the computer processor and configured to:

select, by processing a new network communication, the cluster of the plurality of clusters for the new network communication, wherein the cluster assignment process is separate from the plurality of judge models, and identify, responsive to selecting the cluster, the selected judge model assigned to the cluster;

wherein the selected judge model is further configured to process the new network communication through the selected judge model to obtain a judge selected class of a plurality of classes; and a network routing program configured to route the new network communication from the cluster according to the judge selected class.

10. The system of claim 9, further comprising:

a first stage router executing on the computer processor and configured to:

process the new network communication through a first stage model to generate a prediction for the new network communication; and determine that the prediction fails to satisfy a class threshold for a particular class of the plurality of classes, wherein selecting the cluster of the plurality of clusters for the new network communication is responsive to the prediction failing to satisfy the class threshold.

11. The system of claim 9, wherein selecting the cluster comprises:

extracting a plurality of features of the new network communication; and selecting the cluster according to the plurality of features.

12. The system of claim 8, further comprising:

a first stage training program operating with a first stage router executing on the computer processor and configured to:

train a first stage model with a first stage labeled training dataset to generate a trained first stage model, and process, by the trained first stage model, a second stage unlabeled training dataset to filter the second stage unlabeled training dataset, wherein the second stage unlabeled training dataset comprises the plurality of network communications after filtering.

13. The system of claim 8, wherein the plurality of sample network communications is a predefined portion of the plurality of predictions in the cluster having the discrepancy satisfying a discrepancy threshold.

14. The system of claim 8, further comprising:

a second stage training program configured to:

determining a consensus rate for each cluster of the plurality of clusters using the plurality of predictions for each network communication, and assigning a plurality of clusters satisfying consensus rate to at least one judge model based on resource usage of the at least one judge model.

15. A method comprising:

selecting, by a cluster assignment process, a cluster of a plurality of clusters using a new network communication, wherein the plurality of clusters is determined by a clustering model;

identifying, responsive to selecting the cluster, a selected judge model assigned by a lead model to the cluster, wherein the selected judge model is separate from the clustering model and the cluster assignment process, wherein the selected judge model is selected based on a discrepancy of classifying a plurality of network communications amongst a plurality of judge models, and based on matches between the selected judge model and the lead model;

processing, after identifying the selected judge model, the new network communication through the selected judge model to obtain a judge selected class of a plurality of classes; and routing the new network communication from the cluster according to the judge selected class.

16. The method of claim 15, wherein the new network communication is an LLM prompt.

17. The method of claim 15, further comprising:

processing the new network communication through a first stage model to generate a prediction for the new network communication; and determining that the prediction fails to satisfy a class threshold, wherein selecting the cluster of the plurality of clusters for the new network communication is responsive to the prediction failing to satisfy the class threshold.

18. The method of claim 15, wherein selecting the cluster comprises:

extracting a plurality of features of the new network communication; and selecting the cluster according to the plurality of features.

19. The method of claim 15, further comprising:

training a first stage model with a first stage labeled training dataset to generate a trained first stage model; and processing, by the trained first stage model, a second stage unlabeled training dataset to filter the second stage unlabeled training dataset, performing a clustering and assigning a plurality of judge models comprising the selected judge model using the second stage unlabeled training dataset after filtering.

20. The method of claim 19, further comprising:

determining a consensus rate for each cluster of the plurality of clusters using a plurality of predictions determined from the second stage unlabeled training dataset; and assigning a plurality of clusters satisfying consensus rate
to at least one judge model based on resource usage of
the at least one judge model.

* * * * *